US011514408B2

(12) United States Patent
Cochrane et al.

(10) Patent No.: US 11,514,408 B2
(45) Date of Patent: Nov. 29, 2022

(54) SYSTEM AND METHOD FOR WASTE DIVERSION

(71) Applicant: Continuus Materials Intellectual Property, LLC, The Woodlands, TX (US)

(72) Inventors: Richard Cochrane, Cocoa, FL (US); Marc Lower, Oceanport, NJ (US); Colin Litow, Chicago, IL (US); Matthew Spencer, Palatine, IL (US); Carl V. Rush, Jr., Houston, TX (US); Randal Whitaker, Kingwood, TX (US); William Shepard, Anacortes, WA (US); Richard Toberman, Houston, TX (US)

(73) Assignee: Continuus Materials Intellectual Property, LLC, The Woodlands, TX (US)

(*) Notice: Subject to any disclaimer, the term of this patent is extended or adjusted under 35 U.S.C. 154(b) by 191 days.

(21) Appl. No.: 16/902,381

(22) Filed: Jun. 16, 2020

(65) Prior Publication Data
US 2021/0390518 A1    Dec. 16, 2021

(51) Int. Cl.
*G06Q 10/00*      (2012.01)
*B09B 5/00*      (2006.01)
*G06Q 30/02*      (2012.01)

(52) U.S. Cl.
CPC .............. *G06Q 10/30* (2013.01); *B09B 5/00* (2013.01); *G06Q 30/0207* (2013.01)

(58) Field of Classification Search
None
See application file for complete search history.

(56) References Cited

U.S. PATENT DOCUMENTS

| 2010/0222917 | A1 | 9/2010 | Bohlig et al. | |
| 2011/0137812 | A1* | 6/2011 | Sherga | G06Q 40/04 705/317 |
| 2014/0089074 | A1* | 3/2014 | Londergan | G06Q 10/30 705/14.27 |

(Continued)

FOREIGN PATENT DOCUMENTS

WO    WO-2017/027318 A1    2/2017

OTHER PUBLICATIONS

Yin et al., "Isotope Tracers to Study the Environmental Fate and Bioaccumulation of Metal-Containing Engineered Nanoparticles: Techniques and Applications," Chem. Rev. 2017, 117, 5, 4462-4487, Publication Date: Feb. 17, 2017 (available online at https://doi.org/10.1021/acs.chemrev.6b00693) (Year: 2017).*

(Continued)

*Primary Examiner* — Jan P Mincarelli
(74) *Attorney, Agent, or Firm* — Foley & Lardner LLP (57) ABSTRACT

An illustrative embodiment disclosed herein is a method including receiving, by a waste diversion system and from a source, waste materials, inserting, by the waste diversion system and into the waste materials, one or more markers, generating, by the waste diversion system, finished goods including a portion of the waste materials, and detecting, by the waste diversion system, a portion of the one or more markers corresponding to the portion of the waste materials in the finished goods.

19 Claims, 5 Drawing Sheets

(56) References Cited

U.S. PATENT DOCUMENTS

2018/0120239 A1    5/2018  Wilds et al.
2021/0190974 A1*  6/2021  Schultz .............. G06Q 10/0833

OTHER PUBLICATIONS

Extended European Search Report for European Patent Application No. 21179660.2 dated Nov. 10, 2021, 6 pages.
Canadian Office Action on Canadian Application No. 3122560 dated May 4, 2022.

* cited by examiner

SYSTEM AND METHOD FOR WASTE DIVERSION

BACKGROUND

The following description is provided to assist the understanding of the reader. None of the information provided or references cited is admitted to be prior art.

In the United States, the total generation of municipal solid waste (MSW) in 2017 was 267.8 million tons or 4.51 pounds per person per day. Of the MSW generated, approximately 67 million tons were recycled and 27 million tons were composted. Together, more than 94 million tons of MSW were recycled and composted, equivalent to a 35.2 percent recycling and composting rate. In addition, more than 34 million tons of MSW (12.7 percent) were combusted with energy recovery and more than 139 million tons of MSW (52.1 percent) were landfilled.

SUMMARY

Aspects of the present disclosure relate generally to waste management, and more particularly to a system and method for marking and identifying waste used in producing finished goods.

An illustrative embodiment disclosed herein is a method including receiving, by a waste diversion system and from a source, waste materials, inserting, by the waste diversion system and into the waste materials, one or more markers, generating, by the waste diversion system, finished goods including a portion of the waste materials, and detecting, by the waste diversion system, a portion of the one or more markers corresponding to the portion of the waste materials in the finished goods.

Another illustrative embodiment disclosed herein is a non-transitory computer readable medium including instructions that, when executed by a processor, cause the processor to receive waste materials from a source, insert one or more markers into the waste materials, generate finished goods including a portion of the waste materials, and detect a portion of the one or more markers corresponding to the portion of the waste materials in the finished goods.

Another illustrative embodiment disclosed herein is an apparatus including a processor having programmed instructions to receive waste materials from a source, insert one or more markers into the waste materials, generate finished goods including a portion of the waste materials, and detect a portion of the one or more markers corresponding to the portion of the waste materials in the finished goods.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Enterprises are facing pressure to invest in projects and partnerships that will reduce their waste-to-landfill footprint and, to that end, have corporate policies that any waste from manufacturing may not enter a landfill. Some enterprises are looking for ways to have their waste converted into a finished product. For some enterprises, converting waste into a finished product is not practical, making an offset desirable. There is an opportunity to monetize the practice of waste diversion by creating waste credits. However, to create a waste credit, the waste credit must be linked back to the waste. Conventional systems have labeled waste containers with radio frequency identification (RFID) chips, but this method does not account for the waste materials being separated and processed with additives in order to create the final product. What is needed is a means of demonstrating that the waste inputs have been tracked during the whole process of converting them into finished products.

Disclosed herein are embodiments of a system and method to mark and identify waste materials to demonstrate that the waste materials entering a manufacturing process are ending up in finished goods. Some embodiments of the system and method include inserting a marker into waste, generating a finished good from the waste, and detecting the marker in the finished good. Some embodiments of the system and method produce a valuable waste diversion credit (e.g., waste credit, landfill diversion credit, waste credit unit, waste offset credit, waste diversion credit). The credit's value may be linked to the wasted and established using one of several valuation models, and the credits may be offered for sale by the system to a variety of customers.

Figure 1:
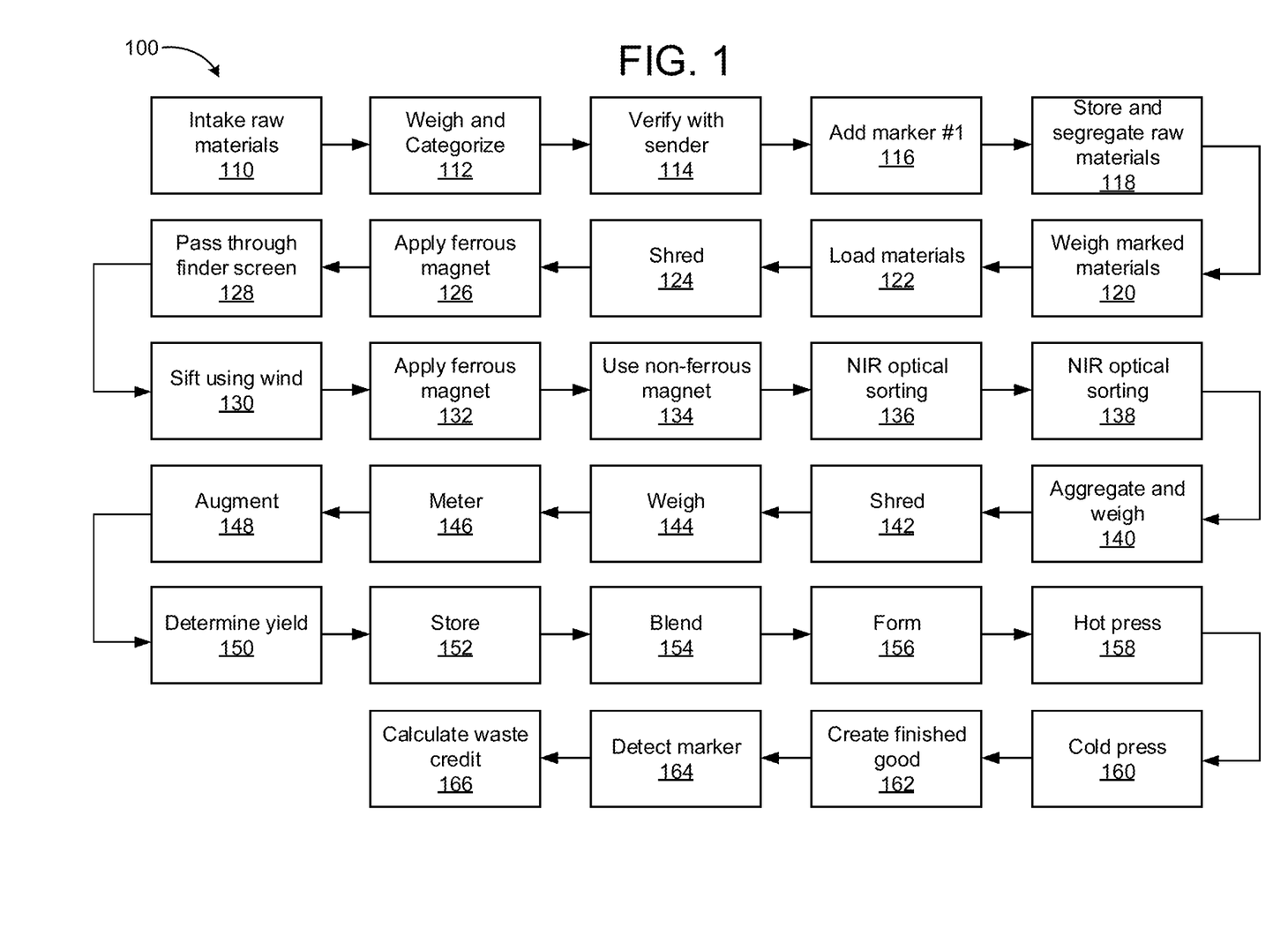
FIG. 1 is an example waste diversion system, in accordance with embodiments of the present disclosure.

Referring now to FIG. 1, an example waste diversion system 100 is shown, in accordance with embodiments of the present disclosure. The waste diversion system 100 includes a number of operations, including intaking raw materials 110, weighing and categorizing incoming waste 112, verifying with the party sending the waste that the materials meet agreed-upon expectations 114, adding a first marker (marker #1) to identify the origin of the waste 116, storing raw materials and segregating marked materials from other waste streams 118, weighing marked materials 120, loading materials 122, processing the materials with a primary shredder 124, applying a ferrous magnet 126, passing the materials through a finger screen 128, sifting the materials using wind 130, applying a ferrous magnet 132, using a non-ferrous magnet 134, performing near-infrared (NIR) optical sorting to remove cellulosic fraction and mark with a second marker (marker #2) 136, and performing another NIR optical sorting to refine a plastic fraction by separating usable and unusable plastic and marking the usable plastic with marker #2 and unusable plastic with marker #3 in operation 138.

The operations continue with aggregating and weighing rejects 140. The rejects can come from the two ferrous magnets, the non-ferrous magnet, the finger screen, the wind sifter, and the NIR optical sorting. Marker #1 can be used to identify the rejected materials.

A secondary shredding is performed at 142. The marked cellulosic and plastic residuals of the sorting and classification process are weighed at 144 and then stored or they continue through the classification and product manufacturing process. Marked cellulosic materials and plastic are metered/measured (via weight) into the dryer in a specified ratio at 146. That is, a measured amount of paper and plastic may be, according to a recipe, released from a holding bin and sent to the dryer. Marked cellulosic materials and plastic are augmented in 148 with additional materials as called for by the product recipe. Residual material weight is compared to rejected materials weight to determine the yield in 150.

The blended marked cellulosic and plastic materials are stored post drying in 152. The operations continue with a blending 154, forming 156, a double-belt-press hot section 158, and a double-belt-press cold section 160. The finished good is then created in 162 using a cut off saw, splitter saw, and edge trim saw.

In 164, the marker is detected and the finished goods containing the marker(s) are weighed. The marked goods can be identified using an RFID chip or other identifier. The marked goods can also be identified by reverse batching, destructive testing, or other means of reverse engineering that allow for the identification of the markers placed in the board during intake or sorting. The finished goods are stacked, and edges are painted.

In 166, a processor with programmed instructions calculates a waste credit weight calculation using a formula such as waste credit=the weight materials received−(the weight of rejected material+the weight of augments+the weight of additives+the weight of facers+loss of material in manufacturing).

Figure 2:
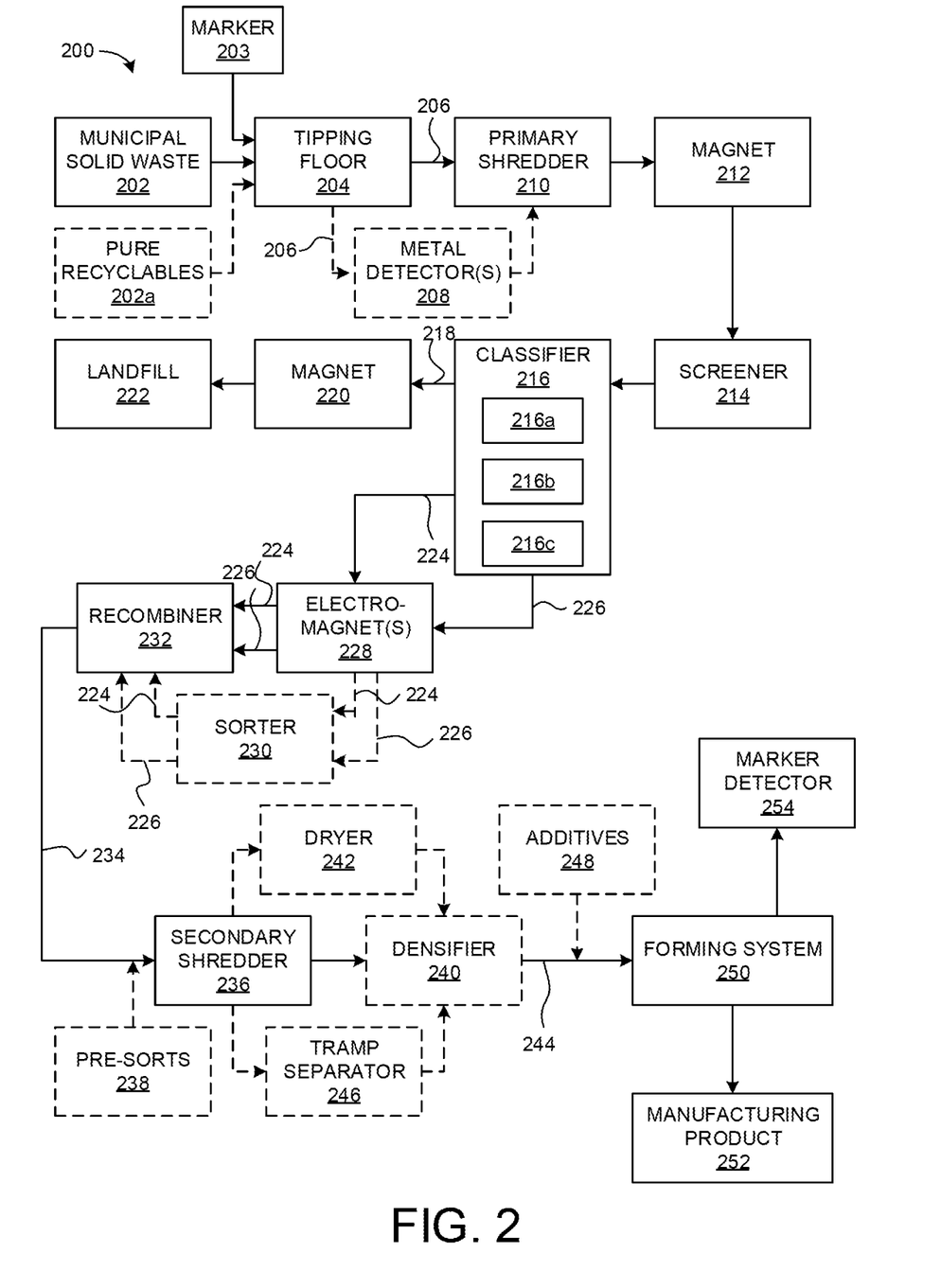
FIG. 2 is another example waste diversion system, in accordance with embodiments of the present disclosure.

FIG. 2 illustrates another example waste diversion system 200. In-bound solid waste collection vehicles may discharge loads of the municipal solid waste 202 on a tipping floor 104 for presorting. The primary feedstock for discharge on the tipping floor 204 is non-hazardous secondary material derived from municipal solid waste otherwise bound for a landfill or an incinerator. A marker device 203 applies a marker (e.g., isotope, chemical) to the in-bound solid waste for tracking and identification purposes.

The municipal solid waste 202 may have undergone some preliminary source separation by households or businesses to extract recyclables collected and processed through local recycling programs where implemented. Moreover, in at least one embodiment, the primary feedstock of the municipal solid waste 202 may be augmented with commercial and industrial secondary material streams, such as hard-to-recycle plastics including, but not limited to, film plastic (low density polyethylene), colored high density polyethylene containers (e.g., laundry detergent containers), polyvinyl chloride (PVC) plastics, polystyrene, polypropylene, and acrylonitrile butadiene styrene (ABS) plastics.

The municipal solid waste 202 can be presorted on the tipping floor 204 to remove very heavy and/or bulky materials, such as tires, mattresses, post-consumer carpet, etc., that may be unsuitable for the manufacturing product. Large ferrous and non-ferrous metals can also be extracted from the municipal solid waste 202 on the tipping floor 204 and may be set aside as rejected materials. Readily identifiable, high quality, and safely accessible recyclable fibers and plastics may be removed, such as by using excavators and wheel loaders. The remaining raw materials of the municipal solid waste 202 comprise a treatable municipal solid waste stream 206 that can then proceed through the processing equipment of the system 200. The system 200 may be capable of capturing about 50-55% of the total, raw in-bound material stream for production of the engineered manufacturing product. As will be appreciated, this percentage would be higher if the incoming feedstock included primarily recycling streams.

After presorting on the tipping floor 204, the treatable municipal solid waste stream 206 may be fed onto a conveyor belt that mechanically conveys the stream 206 away from the tipping floor 204. Conveyor belts (or similar conveyance means) may be used to convey the treatable municipal solid waste stream 206 to and/or through some or all of the component equipment of the system 200. In some embodiments, the treatable municipal solid waste stream 206 may optionally be conveyed from the tipping floor 204 through one or more metal detectors 208. The metal detectors 208 may be configured to detect large metallic items, such as propane tanks and other large metallic or dense items that may be included in the municipal solid waste 202. Such large metal objects may be ejected or otherwise removed from the municipal solid waste stream 206.

The treatable municipal solid waste stream 206 may then undergo a pre-shredding process in a primary shredder 210. Pre-shredding the treatable municipal solid waste stream 206 will break up the materials to produce a homogeneous material suitable for further processing. The primary shredder 210 may be configured to reduce the treatable municipal solid waste stream 206 to a more manageable size, which helps homogenize and volumetrically expand the raw materials therein. In at least one embodiment, the primary shredder 210 may be capable of reducing the materials in the treatable municipal solid waste stream 206 to 10 inch (254 mm) minus dimensional (particle) size. Further shredding may reduce the particle size to about 0.75 inch (approx. 20 mm) minus dimensional size.

The pre-shredded municipal solid waste may then be conveyed past an over-belt magnet 212 configured to extract ferrous materials. The over-belt magnet 212 may be positioned over the conveyor that transports the treatable municipal solid waste stream 206. One or more additional over-belt magnets may be positioned at various locations throughout the system 200 to extract remaining ferrous metals in the treatable municipal solid waste stream 206 and thereby maximize ferrous metal recovery. All ferrous metals extracted from the treatable municipal solid waste stream 206 may be recycled.

The treatable municipal solid waste stream 206 may undergo screening via a screener 214 configured to extract organic materials. A substantial portion of the extracted organic materials may comprise food waste, for example. All or substantially all of the organic material can be extracted via the screener 214 and subsequently composted and/or used in anaerobic digestion to generate biogas for combustion. The screener 114 (alternately referred to as a "waste screen") may comprise a multi-tiered vibrating deck unit designed to screen out materials that are less than 2 inch (approx. 50 mm) particle size. Materials that may be screened out include, but are not limited to, food waste, aggregates, E-waste (batteries), glass, etc.

The treatable municipal solid waste stream 206 may be conveyed to a multi-step air classifier 216 configured to separate the raw materials in the municipal solid waste stream 206 by weight density and thereby produce a plurality of distinct streams. More specifically, the multi-step air classifier 216 may include a first section 216a designed to separate out heavy weight materials 218 from the municipal solid waste stream 206, which may primarily comprise inert waste unsuitable for the manufacturing product. The first section 216a may be capable of removing all or substantially all of the heavy weight materials 218 from the municipal solid waste stream 206, which may comprise about 25-30% of the municipal solid waste 202. After passing under an over-belt magnet 220 to extract remaining ferrous metals, the stream of heavy weight materials 218 may be disposed of in a landfill 222.

The remaining portion of the municipal solid waste stream 206 may then be conveyed to a second section 216b of the multi-step air classifier 216. The second section 216b may be designed to separate medium weight materials 224 from lightweight materials 226 and thereby form two distinct streams. While only two streams 224, 226 are depicted, it is contemplated herein that additional streams of medium or lightweight materials might also be formed. In certain embodiments, the medium weight materials 224 may represent around 50-55% of the raw-in bound material mass balance. The classifier 216 also includes a marker 216c that applies a marker to the material streams.

Separation within each section 216a, b of the multi-step air classifier 216 can be performed by weight density based on air flows, residence times, and/or material recirculation. In some embodiments, equipment operators can select materials for recirculation and can move materials between sections 216a,b to control the materials that ultimately exit the air classifier 216. In addition, controlled particulate matter air scrubbers (not shown) can be used in the air classifier 216 to eliminate dust within the negative-air controlled confines of the system 200.

Following discharge from the multi-step air classifier 216, the medium and light weight material streams 224, 226 may then be exposed to one or more electromagnets 228 (e.g., eddy currents) to help remove nonferrous metals from each stream 224, 226. The non-ferrous metals extracted using the electromagnets 228 may be collected for recycling, if desired.

In some embodiments, the medium and light weight material streams 224, 226 may optionally be conveyed to a sorter 230 designed to identify and eject polyvinyl chloride (PVC) plastic materials, which exhibit high chlorine content. In such embodiments, the sorter 230 may comprise a near infrared (NIR) spectroscopic and/or hyperspectral imaging (HSI) system. In certain embodiments, such as where the manufacturing product might be used as a fuel, chlorine removal may be critical in altering the chemical composition of the fuel and thereby improve fuel characteristics and performance.

The sorter 230 may also be programmed to identify and eject metallic materials not extracted by over-belt magnets (e.g., magnets 212) or eddy currents (e.g. electromagnet 228). More specifically, the sorter 230 may be configured to detect the light reflected from the objects onto highly sensitive NIR sensors and, in some embodiments, may be capable of detecting objects as small as one-half inch in size. The sorter 230 may be able to identify and pinpoint the location of particular objects present in the medium weight material stream 218 or the lightweight material stream 220. A precise puff of air from one or more nozzles associated with the sorter 230 can reject any undesirable materials before the medium and light weight material streams 224, 226 are discharged from the sorter 230.

It is contemplated herein that equipment similar to the sorter 230 may also be utilized in various other locations in the system 200. For example, an NIR scanner may be incorporated prior to the primary shredder 210, prior to the screener 214, prior to and/or following the multi-step air classifier 216, and/or at other points in the system 200 system. Such NIR scanners may help detect moisture in the municipal solid waste, and the data recorded by the NIR scanners can be used to either increase or reduce the process flow rate. For example, when the process flow rate is reduced, more moisture laden material can be extracted from the municipal solid waste, preferably at an early stage of the system 200 to promote more efficient separation of heavy weight materials 218, medium weight materials 224, and lightweight materials 226. The NIR scanners may also be used to detect moisture in the municipal solid waste 202 at later stages in the system 200 to control the moisture content of the manufacturing product.

After passing through the electromagnet(s) 228 (or optionally following processing in the sorter 230), the medium and light weight material streams 224, 226 may be proportionately recombined in a recombiner 232. In some embodiments, the mix of the medium and light weight material streams 224, 226 may produce a recombined stream 234 that is approximately 50% fiber and 50% plastic (e.g., +/−5%). The recombined stream 234 may then be conveyed to a secondary shredder 236.

In some embodiments, prior to entering the secondary shredder 236, the recombined stream 234 may be "fine-tuned" through the addition of known materials. More specifically, a stream of pre-sorted materials 238 may optionally be added in proportion to the recombined stream 234 either within or following the recombiner 232 and thereby produce a "fine-tuned" recombined stream 234. The pre-sorted materials 238 are selected clean recyclable materials known as "pre-sorts" that comprise streams of clean recyclable fibers (e.g., cellulose-based materials) and/or clean recyclable plastics. The pre-sorted materials 238 may exhibit known properties that will produce desired structural properties in the manufacturing product. With the addition of the pre-sorted materials 238, the fine-tuned recombined stream 234 can be used to produce a manufacturing product that meets customer specifications for various desired features.

Suitable plastic pre-sorts, for example, include, but are not limited to, polyethylene, polypropylene, and polystyrene plastics, such as postindustrial waste like polypropylene automobile carpet trims and/or polyethylene food wrappers. Suitable fiber pre-sorts include, but are not limited to, mixed papers, old newsprint, and cardboard.

The pre-sorted materials 238 may be stored separately from any inbound municipal solid waste coming in the system 200 and may be added to the recombined stream 234 at a metered rate. In some embodiments, the pre-sorted materials 238 can be added to the municipal solid waste stream 206 at other locations in the system 200, or in addition to the recombined stream 234. For example, the pre-sorted materials 238 may be added to the municipal solid waste stream 206 prior to the primary shredder 210, and/or prior to the multi-step air classifier 216. In some embodiments, adding the pre-sorted materials 238 to the municipal solid waste stream 206 early in the process may reduce the moisture percentage in the municipal solid waste 202 and promote more efficient separation of heavy weight materials, medium weight materials, and lightweight materials. The recombined stream 234 may then undergo additional shredding and/or granulation in the secondary shredder 236, which may comprise a high-speed shredder. The purpose of this additional shredding is to produce a particle size that can easily pass through the subsequent processing steps without causing plugging of the machinery. In some embodiments, for example, the secondary shredder 236 may shred the recombined stream 234 to a particle size of 2 inches (approx. 50 mm) or less. In other embodiments, the secondary shredder 236 may shred the recombined stream 234 to a particle size of 0.75 inches (approx. 20 mm) or less. In at least one embodiment, the recombined stream 234 may be repeatedly cycled through the secondary shredder 236 (or another shredder) until granulated to a particle size of about 0.025 inches (approx. 0.6 mm). As will be appreciated, the type of manufacturing product that can be produced may depend on particle size, and smaller particle sizes may prove advantageous in producing thinner and/or stiffer manufacturing products.

Following the secondary shredder 236, in some embodiments, the recombined stream 234 may be conveyed to a densifier 240 for densification, but densification may not be necessary or desired. Optionally, it may be desired to dry the contents of the recombined stream 234 prior to densification. In such embodiments, the recombined stream 234 may optionally be staged and dried in a dryer 242 and subsequently processed in the densifier 240. In embodiments where the dryer 242 and the densifier 240 are used, the dryer 242 may be configured to dry the recombined stream 234 to approximately 15% moisture content, and in at least one embodiment, the recombined stream 234 may be dried to approximately 5% moisture content. During densification, the densifier 240 will typically release approximately 5% moisture in the form of steam, thus yielding a product feed 244 with a moisture content of approximately 10%.

Alternatively, the recombined stream 234 may simply be dried in the dryer 142, without passing through the densifier 240. In such embodiments, the moisture content can be reduced to about 5%, which may be achieved utilizing the dryer 242 by itself and/or by adding dry pre-sorts (e.g., the pre-sorted materials 238) to the municipal solid waste stream 206 at various stages of the process.

In one or more embodiments, the recombined stream 234 may optionally be conveyed through a tramp separator 246 prior to being received by the densifier 240. The tramp separator 246 may be configured to undertake an additional (final) extraction step that ensures elimination of "tramp metals," which refers to ferrous or non-ferrous metals and inert fines of 1-inch or less that have not already been removed and that might damage subsequent equipment in the system 200. Following the optional tramp separator 246, the composition of the process recombined stream 234 may be 99% or greater post-recycle fibers and plastic. In at least one embodiment, the recombined stream 234 may sequentially pass through the dryer 242 and the tramp separator 246 prior to being processed in the densifier 240.

In some embodiments, the product feed 244 may comprise approximately 99.7% fiber (e.g., cellulose-based materials, such as paper, cardboard, etc.) and plastic as discharged from the densifier 240. Moreover, in at least one embodiment, the product feed 244 may comprise approximately 50% fiber and approximately 50% plastic, +/−5%. In other words, the product feed 244 include about 45-55% cellulose-based materials and about 45-55% plastic. In other embodiments, as mentioned above, the product feed 244 may comprise about 60% fibers and about 40% plastic, +/−5%. In other words, the product feed 244 may consist of about 55-65% cellulose-based materials and about 35-45% plastics.

In some embodiments, various additives 248 may optionally be included in or otherwise added to the product feed 244. Example, additives 248 include, but are not limited to, a marker (e.g., isotope, chemical), a flame retardant, a water repellant, a bonding agent (e.g., an adhesive), or any combination thereof.

The product feed 244 may be conveyed to a forming system 250 operable to generate or otherwise produce a manufacturing product 25 from the product feed 244. The forming system 250 may include or otherwise comprise a variety of dies and presses configured to convert the product feed 244 into the manufacturing product 252. The forming system 250 may be capable of generating (fabricating) the manufacturing product 252 to any desired shape or size, and exhibiting a variety of desirable characteristics (i.e., hardness, durability, flammability, etc.). Moreover, depending on the type(s) of additives 248 added to the product feed 244, the manufacturing product 252 may exhibit physical properties such as, but not limited to, fire resistant, hydrophobic, impact resistant, mold resistant, or any combination thereof. A marker detector 254 can be applied to detect markers present in the remaining material. The marker detector 254 can send data to a processor with programmed instructions to calculate a waste disposal credit.

In at least one embodiment, the forming system 250 may include one or more hydraulic or pneumatic presses configured to form the manufacturing product 252 via pressing or stamping. The press(es) may include, for example, opposing flat platens, which may further include opposing mold halves mounted thereto to mold the manufacturing product into a two-dimensional (e.g., flat) or three-dimensional geometric shape, such as by compression molding. The amount of pressure applied by the press(es) may range between about 10 psi and about 200 psi. In at least one embodiment, the press(es) may have the capacity to exert up to 150 psi (specific pressure) evenly across the mat area.

In some applications, operation of the press(es) may cause the temperature of the product feed 244 to increase, which may melt the plastic particles and particulates present within the mass. As a result, the plastic constituent may flow and serve as a bonding agent that binds the material in a rigid or semi-rigid form. In some embodiments, however, an additional bonding agent (e.g., an adhesive or the like) may be added to help bind the material, such as being included as one of the additives 248 to the product feed 244.

In some embodiments, the forming system 250 may include or otherwise incorporate one or more heaters or heating devices configured to apply thermal energy (i.e., heat) to the product feed 244 to help melt the plastic. In at least one embodiment, an electric heater may be used to generate the necessary thermal energy, but other types of heaters or heating devices may be used, without departing from the scope of the disclosure. The thermal energy may be applied continuously or intermittently to increase the temperature of the product feed 244 to a temperature ranging between about 200° F. and about 350° F., or greater than 350° F. In at least one embodiment, the thermal energy may be applied to the product feed 244 prior to entering the forming system 250 but may alternatively be applied to the product feed 244 while compressed within the press(es) of the forming system 250. The thermal energy, coupled with the force of the press(es), causes the plastic constituent in the product feed 244 to flow into the network of interstices of the remaining material (e.g., fiber) to form the rigid or semi-rigid manufacturing product 252.

Figure 3:
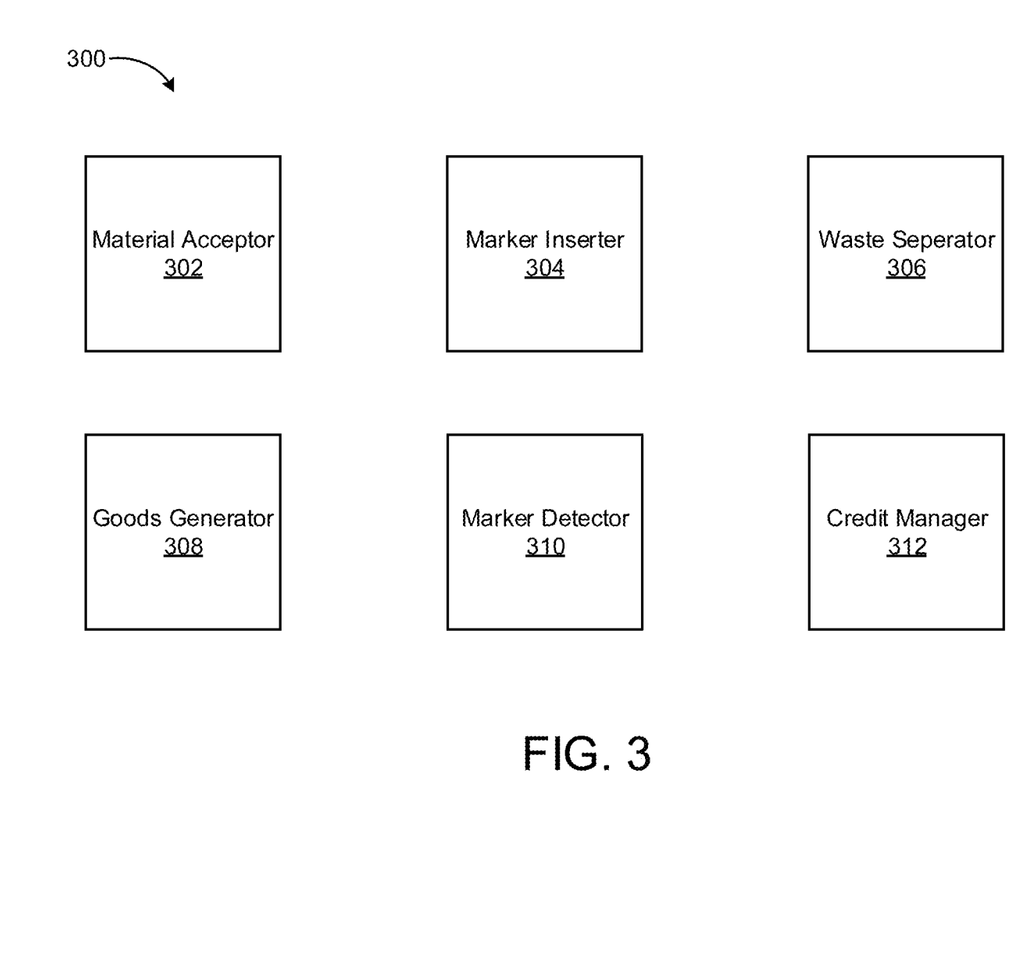
FIG. 3 is an example waste diversion system, in accordance with embodiments of the present disclosure.

Referring now to FIG. 3, the waste diversion system 300 includes a material acceptor 302, a marker inserter 304, a waste separator 306, a goods generator 308, a marker detector 310, and a credit manager 312. One or more of the structures described with respect to FIG. 2 may constitute the material acceptor 302, marker inserter 304, waste separator 306, goods generator 308, marker detector 310, and credit manager 312.

The material acceptor 302 comprises a processor with programmed instructions (herein, "has instructions") to intake raw materials (e.g., raw waste materials, incoming waste, residual materials, materials, waste). The raw materials include at least one of municipal solid waste (e.g., commercial, residential), post-industrial waste, municipal recycling facility residuals, recycled paper, plastic, or cartons (e.g., grade #52). In some embodiments, the material acceptor 302 has instructions to weigh and visually categorize the raw materials.

The material acceptor 302 may have instructions to reject or accept the raw materials (e.g., all of the raw materials) based on a criteria (e.g., determination). In some embodiments, the criteria includes at least one of determining (e.g., predicting) that the raw materials exceed a predetermined yield (e.g., 10%) of usable material after sorting (e.g., by the waste separator 306), determining that the raw materials are non-hazardous, determining that a ratio (e.g., portion, percentage, amount) of the raw materials that is cellulosic (e.g., paper) or plastic exceeds a predetermined threshold (e.g., 50%), determining that a moisture content of the raw materials is below a predetermined moisture percentage/amount (e.g., 90%), determining that a threshold associated with waste offset credit is exceeded, or the like. In some embodiments, predicting includes using visual inspections of the incoming materials and predictive modeling of trash collection routes and sources to determine expected yield.

In some embodiments, the material acceptor 302 has instructions to document the receipt of the raw materials. The documentation includes at least one of origin, weight on bill of lading, whether the raw materials were accepted or rejected, appearance, and predicted yield. In some embodiments, the material acceptor 302 has instructions to verify with sender that the raw materials received meet agreed upon expectations.

The marker inserter 304 comprises a processor with programmed instructions (herein, "has instructions") to insert (e.g., add, incorporate), or cause/request/identify a third party to insert, one or more markers into the accepted raw materials to be able to identify the raw materials, including, in some embodiments, at least one of the origin/provider/source of the raw materials or the composition of the raw materials. The one or more markers include at least one of isotopic markers, chemical markers, infrared markers, dyes, paints, colorants, fluorescing compounds, paper tracers, plastic tracers, radio-frequency identification (RFID) chips, or the like. Isotopic, chemical markers, dyes, paints, fluorescing compounds may be aqueous and, in some embodiments, are inserted into the material stream via spraying. Infrared markers may be powder form or aqueous and, in some embodiments, liquids are sprayed and powders are delivered by auger. Paper and plastic tracers may be augured in. In some embodiments, RFID are placed by hand or robot.

In some embodiments, the marker inserter 304 has instructions to weigh the marked materials, in some embodiments, prior to inserting the markers and/or, in some embodiments, after inserting the markers but prior to processing by the waste separator 306. In some embodiments, the marker inserter 304 has instructions to determine (e.g., calculate) an amount (e.g., number) of pixels of the one or more markers to insert in the raw materials. In some embodiments, the amount of pixels to insert is determined based on (e.g., in proportion with, proportional to) the weight. In some embodiments, the marker inserter 304 has instructions to insert an amount of the one or more markers (e.g., an amount of pixels) based on (e.g., in proportion with, proportional to) the weight. In some embodiments, pixels are a measurement of surface area, which is two dimensional (2D). In some embodiments, the 2D measurement is converted into a 3D shape (herein "pixel box"). In some embodiments, a size of the 3D shape is equal to, or approximately, 0.26 mm^3. In some embodiments, the volume of the finished good will be divided by the 3D shape size to determine the number of pixel boxes in the finished good. The weight of the finished good may divided by the number of pixel boxes and weight will be assigned to each pixel box. In some embodiments, the marker inserter 304 has instructions to store the marked raw materials (e.g., marked materials), including segregating the marked materials.

The waste separator 306 comprises a processor with programmed instructions (herein, "has instructions") to separate (e.g., sort, classify, accept a part and reject a part, or otherwise process) the marked materials. In some embodiments, the waste separator 306 has instructions to load the marked materials into one or more apparatuses for separating the marked materials. The waste separator 306 and/or the apparatuses for separating include at least one of a primary shredder, a ferrous magnet, a finger screen, a wind sifter, an Eddy current (e.g., a non-ferrous magnet), an near-infrared (NIR) optical sorter, or secondary shredding.

In some embodiments, the waste separator 306 has instructions to mark the raw materials or the raw unmarked materials. For example, the NIR optical sorter inserts markers while separating cellulosic and plastic materials to identify (e.g., mark, trace) the cellulosic and plastic materials. A first NIR optical sorter may separate a cellulosic portion (e.g., fraction) from the marked or unmarked materials and insert one or more markers in the cellulosic portion.

A second NIR optical sorter may separate a plastic portion from the marked or unmarked materials, refine the plastic portion, and insert one or more markers in the plastic portion. Refining the plastic portion may include keeping usable plastic and rejecting unusable plastic. In some embodiments, the waste separator 306 has instructions to weigh and/or store the cellulosic and plastic portions.

The goods generator 308 comprises a processor with programmed instructions (herein, "has instructions") to generate finished goods (e.g., product) from the marked and separated waste materials (e.g., separated materials). The goods generator 308 includes at least one of a dryer mixer, a mixed bin, a blender, a forming section, a double-belt-press hot section, a double-belt-press cold section, a cut off saw, a splitter saw, an edge trim saw, a stack, or edge paint.

In some embodiments, the goods generator 308 has instructions to meter (via weight) the marked cellulosic materials and plastic are metered into the dryer in a specified ratio. In some embodiments, marked cellulosic materials and plastic may be augmented (e.g., combined, mixed) with materials based on recipe for the finished goods.

The marker detector 310 comprises a processor with programmed instructions (herein, "has instructions") to detect the one or more markers in the finished goods. The finished goods include a portion of the marked raw materials. The marker detector 310 has instructions to detect the one or more markers in the portion of the marked raw materials in the finished goods. In some embodiments, the marker detector 310 has instructions to determine an amount (e.g., a number) of pixels (e.g., or any unit of measure) corresponding to the portion of the one or more markers in the finished goods. In some embodiments, the marker detector 310 determines the weight based on (e.g., in proportion with, proportional to) the number of pixels. In some embodiments, the marker detector 310 determines that the weight of the portion of the one or more markers in the finished goods is proportional to the number of pixels that is detected.

In some embodiments, the marker detector 310 weighs the finished goods. The finished goods may be marked (e.g., labeled, chipped with an RFID, or otherwise identified) as containing materials from the finished goods recipient. The finished goods recipient is same as the source of the waste materials, in some embodiments.

In some embodiments, detecting the marker includes at least one of detecting paper or plastic tracers using NIR optical detection, detecting radiation of isometric markers, detecting an isotope, detecting isometric markers using mass spectrometry, infrared spectrometry, or nuclear magnetic resonance, detecting chemical markers using mass spectrometry, detecting infrared or near-infrared markers using an infrared or near-infrared detector, detecting an RFID chip using an RFID reader, detecting fluorescing compounds using fluorophores, detecting dyes, paints, colorants, paper or plastic tracers, or the like. In some embodiments, the marker detector 310 identifies materials in the finished goods by reverse batching, destructive testing, or other means of reverse engineering that allow for the identification of the markers placed in the board during intake or sorting.

In some embodiments, the marker detector 310 has instructions to compare raw material weight to rejected materials weight to determine a yield. In some embodiments, goods generator 308 has instructions to calculate the yield as a ratio/percentage/amount of weight of the raw materials out of a weight of the rejected materials. In some embodiments, the marker detector 310 has instructions to determine a yield as ratio of the weight of the portion of waste materials in the finished goods and a second weight of the waste materials marked upon receipt.

The credit manager 312 comprises a processor with programmed instructions (herein, "has instructions") to calculate a waste credit associated with waste materials (e.g., from one transaction, batch, vendor, etc.) and/or finished goods including the waste materials. In some embodiments, the credit manager 312 calculates the waste credit as the weight of materials received less than the sum of at least one of the weight of rejected material, the weight of augments, the weight of additives, the weight of facers, and the loss of material in manufacturing.

In some embodiments, independent third-party auditing firm periodically confirms, via visual inspection, forensic accounting, and other means that the quantity of credits offered equals the finished goods produced and the raw materials consumed. The auditor may verify that the systems and process described above are in place and working properly.

In some embodiments, to support the monetization of waste credits a marketplace for the purchasing, the credit manager 312 creates and manages selling and trading waste credits. In some embodiments, a waste Credit is defined as a unit equal to the value of a predetermined amount (e.g., 2000 lb) of inorganic waste diverted or recovered from landfill that has been transformed into a product with real value.

In some embodiments, the credit manager 312 has instructions to determine a valuation using a credit unit valuation model. In some embodiments, the credit manager 312 has instructions to sell units to interested parties with a valuation equal to the average of (the rolling 3 month (90 day) average spot price per ton of mixed paper+the rolling 3 month (90 day) average spot price per ton of mixed plastic+the rolling 3 month (90 day) average spot price per ton of grade #52 cartons)+the cost to transform the waste into a product with real value (the rolling 3 month average conversion costs (fixed and variable) associated with sorting and transforming the waste into a product)+the rolling 3 month (90 day) average the cost of yield loss X the London Inter-bank Offered Rate (LIBOR).

In some embodiments, the credit manager 312 has instructions to sell units to interested parties with a valuation equal to the cost or fee for disposing of one ton of waste. Acknowledging that fees for waste disposal vary based on a number of factors the credit units' value may consider the cost or fee based on the type waste, location of the waste, customer type (commercial or residential), and the intended finial disposition of the waste. In some embodiments, the credit manager 312 has instructions to sell units to interested parties using the Dutch Auction method where bids for price and quantity of units are taken over a specified time period. The highest ratio of price to quantity of units may the winner.

In some embodiments, the credit manager 312 has instructions to sell units to interested parties using the English Auction method where bids for a single unit are taken over a specified time period. The highest bid price for that specified time period may the winner. In some embodiments, the credit manager 312 has instructions to sell units to interested parties with a value equal to the combined cost to produce 1000 lb. of polyethylene plastic film and 1000 lb. of 20 lb. basis weight paper. Publicly available cost information may be used as to establish the costs.

In some embodiments, the credit manager 312 has instructions to sell units to interested parties with a value equal to the average selling price per ton of its finished goods. The average selling price may be determined using the weighted average of all good sold by the credit manager 312 over the course of a rolling year. In some embodiments, the credit manager 312 has instructions to sell units to interested parties with a value equal to upfront cost associated with an Extended Producer Responsibility (ERP). The waste credit unit buyer must demonstrate their cost, on a per ton basis, to comply with ERP requirements In some embodiments, the credit manager 312 has instructions to sell, convey, lease, trade, or transfer, or enable third parties to sell, convey, lease, trade, or transfer waste credit. Waste credits are made available to consumers, companies, corporations, financial institutions, governments and other entities for purchase. The credit manager 312 may have instructions to conduct the sale or authorize others to conduct sales at its (e.g., sole) discretion. In some embodiments, the waste credits can be included in a marketplace for waste disposal credit trading by and between parties such that valuation of waste disposal credits can be determined by the marketplace based on transactions between parties.

In some embodiments, the credit manager 312 has instructions to determine the valuation model that is used to establish the price per waste credit unit prior to the sale. In some embodiments, the valuation model employed is at the (e.g., sole) discretion of credit manager 312. The credit manager 312 may instructions to choose to change or update valuation models. In some embodiments, the credit manager 312 has instructions to trade waste credits for goods and services equal to the price of a waste credit unit. In some embodiments, the credit manager 312 has instructions to determine the valuation model that is used to establish the price per waste credit unit prior to the trade. The waste credit units available may be equal to the number of tons of product produced by the credit manager 312.

Figure 4:
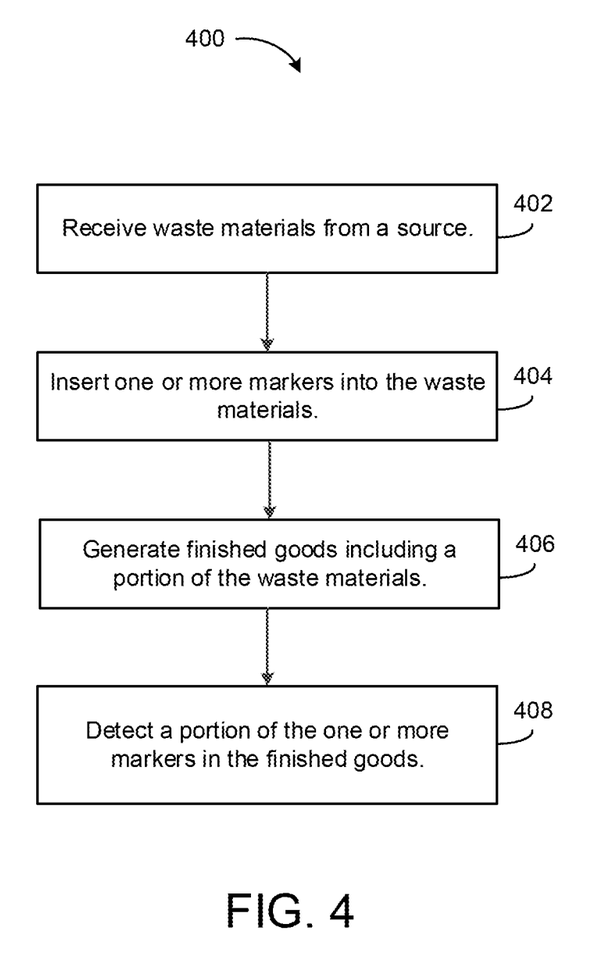
FIG. 4 is a flowchart diagram illustrating a method for marking waste, in accordance with some embodiments of the present disclosure.

FIG. 4 is a flowchart diagram illustrating a method 400 for marking waste, in accordance with some embodiments of the present disclosure. Referring to FIG. 3, the method 400 can be performed by the waste diversion system 300, an apparatus (a material acceptor 302, a marker inserter 304, a waste separator 306, a goods generator 308, a marker detector 310, and a credit manager 312) of the waste diversion system 300, or processor associated with the waste diversion system 300 or the apparatus thereof, in some embodiments. Additional, fewer, or different operations may be performed in the method 400 depending on the embodiment.

A waste diversion system, such as the waste diversion system 300, receives waste materials from a source (402). In some embodiments, the waste diversion system determines a weight of the waste materials. In some embodiments, the waste diversion system determines an amount of pixels of the one or more markers in proportion to the determined weight.

The waste diversion system inserts one or more markers into the waste materials (404). In some embodiments, the one or more markers identify at least one of the sources or a composition of the waste materials. In some embodiments, the waste diversion system inserts the number of pixels in proportion to the determined weight.

The waste diversion system generates finished goods including a portion of the waste materials (406). The waste diversion system detects a portion of the one or more markers corresponding to the portion of the waste materials in the finished goods (408). In some embodiments, the waste diversion system detects an number of pixels of the portion of one or more markers. In some embodiments, the waste diversion system determines a weight of the portion of waste materials in the finished goods in proportion to the number of pixels detected.

In some embodiments, the waste diversion system determines a yield as ratio of the weight of the portion of waste materials in the finished goods and a second weight of the waste materials marked upon receipt. In some embodiments, the waste diversion system determines a credit value associated with the finished goods based on detecting the one or more markers. In some embodiments, the waste diversion system determines the credit value as a weight of materials received less than a sum of at least one of a weight of rejected material, a weight of augments, a weight of additives, a weight of facers, and a loss of material in manufacturing.

Figure 5:
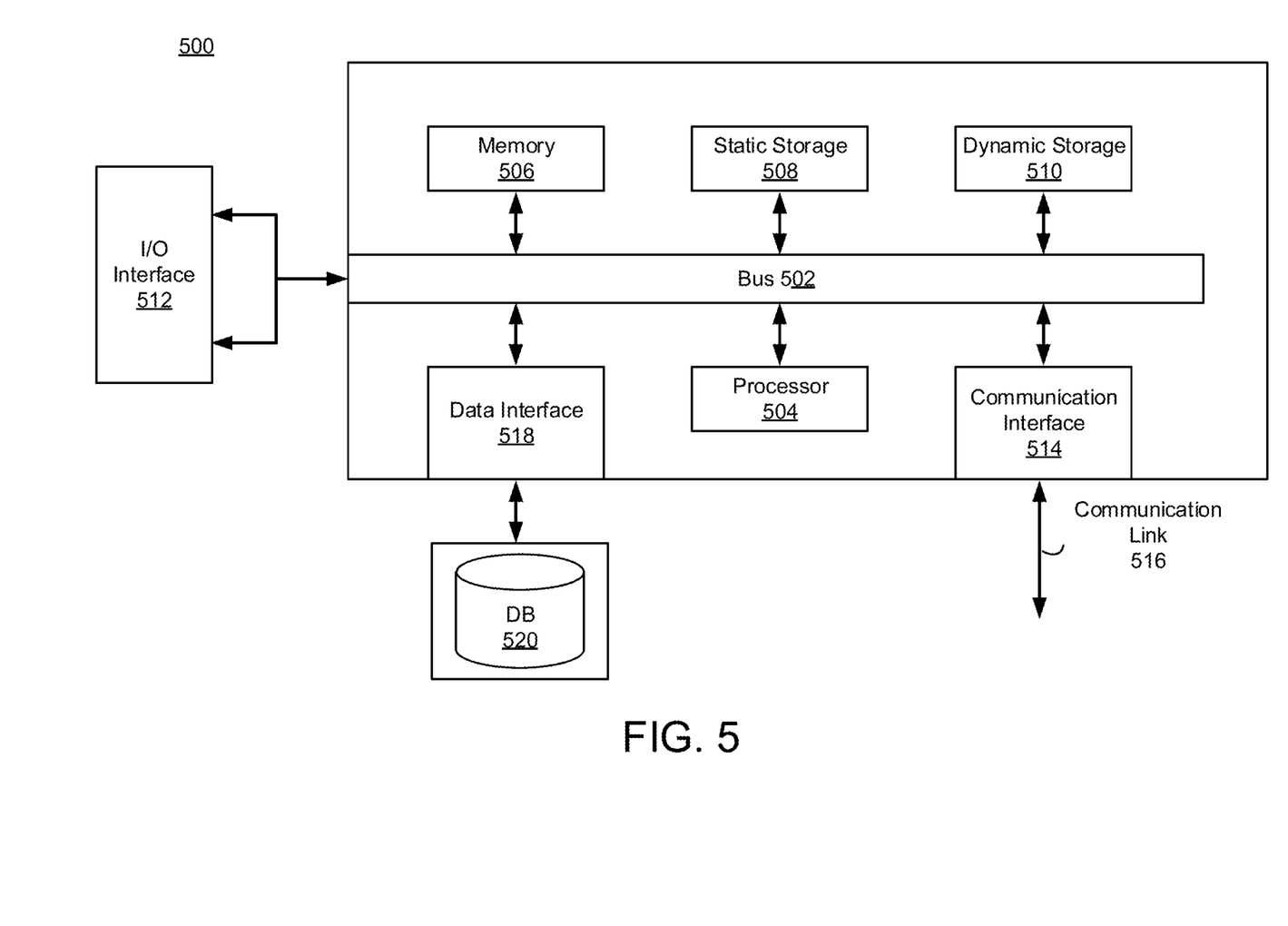
FIG. 5 is a block diagram of an illustrative computing system suitable for implementing some embodiments of the present disclosure.

Referring to FIG. 5, illustrated is a block diagram of an illustrative computing system 500 suitable for implementing particular embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa. Moreover, reference to a computer system may encompass one or more computer systems.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Computer system 500 may include one or more computer systems 500; be unitary or distributed; span multiple locations; span multiple machines; span multiple data centers; or reside in a cloud, which may include one or more cloud components in one or more networks. One or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein.

In some embodiments, the computer system 500 includes a bus 502 (e.g., an address bus and a data bus) or other communication mechanism for communicating information, which interconnects subsystems and devices, such as processor 504, memory 506 (e.g., RAM), static storage 508 (e.g., ROM), dynamic storage 510 (e.g., magnetic or optical), communication interface 514 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 312 (e.g., keyboard, keypad, mouse, microphone). In particular embodiments, computer system 300 may include one or more of any such components.

In particular embodiments, processor 504 includes hardware for executing instructions, such as those making up a computer program. In some embodiments, each of the apparatuses/components (a material acceptor 302, a marker inserter 304, a waste separator 306, a goods generator 308, a marker detector 310, and a credit manager 312) of the waste diversion system 300 comprises or is coupled to one or more (e.g., shared or dedicated) processors 504. As an example and not by way of limitation, to execute instructions, processor 504 may retrieve (or fetch) the instructions from an internal register, an internal cache, memory 506, static storage 508, or dynamic storage 510; decode and execute them; and then write one or more results to an internal register, an internal cache, memory 506, static storage 508, or dynamic storage 510. In particular embodiments, processor 504 may include one or more internal caches for data, instructions, or addresses. This disclosure contemplates processor 504 including any suitable number of any suitable internal caches. As an example and not by way of limitation, processor 504 may include one or more instruction caches, one or more data caches, and one or more translation lookaside buffers (TLBs). Instructions in the instruction caches may be copies of instructions in memory 506, static storage 508, or dynamic storage 510, and the instruction caches may speed up retrieval of those instructions by processor 504. Data in the data caches may be copies of data in memory 506, static storage 508, or dynamic storage 510 for instructions executing at processor 504 to operate on; the results of previous instructions executed at processor 504 for access by subsequent instructions executing at processor 504 or for writing to memory 506, static storage 508, or dynamic storage 510; or other suitable data. The data caches may speed up read or write operations by processor 504. The TLBs may speed up virtual-address translation for processor 504. In particular embodiments, processor 504 may include one or more internal registers for data, instructions, or addresses. This disclosure contemplates processor 504 including any suitable number of any suitable internal registers. Processor 504 may include one or more arithmetic logic units (ALUs); be a multi-core processor; or include one or more processors 504. Although this disclosure describes and illustrates a particular processor, this disclosure contemplates any suitable processor.

In particular embodiments, I/O interface 512 includes hardware, software, or both, providing one or more interfaces for communication between computer system 500 and one or more I/O devices. Computer system 500 may include one or more of these I/O devices. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 512 for them. I/O interface 512 may include one or more device or software drivers enabling processor 504 to drive one or more of these I/O devices. I/O interface 512 may include one or more I/O interfaces 512. Although this disclosure describes and illustrates a particular I/O interface, this disclosure contemplates any suitable I/O interface.

In particular embodiments, communication interface 514 includes hardware, software, or both providing one or more interfaces for communication (such as, for example, packet-based communication) between computer system 500 and one or more other computer systems 500 or one or more networks. As an example and not by way of limitation, communication interface 514 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 514 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 514 for any of these networks. Communication interface 514 may include one or more communication interfaces 514. Although this disclosure describes and illustrates a particular communication interface, this disclosure contemplates any suitable communication interface.

One or more memory buses (which may each include an address bus and a data bus) may couple processor 504 to memory 506. Bus 502 may include one or more memory buses, as described below. In particular embodiments, one or more memory management units (MMUs) reside between processor 504 and memory 506 and facilitate accesses to memory 306 requested by processor 504. In particular embodiments, memory 506 includes random access memory (RAM). This RAM may be volatile memory, dynamic RAM (DRAM) or static RAM (SRAM). Moreover, this RAM may be single-ported or multi-ported RAM. This disclosure contemplates any suitable RAM. Memory 506 may include one or more memories 506. Although this disclosure describes and illustrates particular memory, this disclosure contemplates any suitable memory.

The ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 510 may include a hard disk drive (HDD), a floppy disk drive, flash memory, an optical disc, a magneto-optical disc, magnetic tape, or a Universal Serial Bus (USB) drive or a combination of two or more of these. Dynamic storage 510 may include removable or non-removable (or fixed) media. Dynamic storage 510 may be internal or external to computer system 500. This disclosure contemplates mass dynamic storage 510 taking any suitable physical form. Dynamic storage 510 may include one or more storage control units facilitating communication between processor 504 and dynamic storage 510.

In particular embodiments, bus 502 includes hardware, software, or both coupling components of computer system 500 to each other. As an example and not by way of limitation, bus 502 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 302 may include one or more buses. Although this disclosure describes and illustrates a particular bus, this disclosure contemplates any suitable bus or interconnects.

In some embodiments, computer system 500 performs specific operations by processor 504 executing one or more sequences of one or more instructions contained in memory 506. Such instructions may be read into memory 506 from another computer readable/usable medium, such as static storage 508 or dynamic storage 510. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 504 for execution. Such a medium may take many forms, including but not limited to, nonvolatile media and volatile media. Non-volatile media includes, for example, optical or magnetic disks, such as static storage 508 or dynamic storage 510. Volatile media includes dynamic memory, such as memory 506.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 500; in alternative embodiments, two or more computer systems 500 coupled by communication link 516 (e.g., LAN, PTSN, or wireless network) may perform the sequence of instructions in coordination with one another.

Computer system 500 may transmit and receive messages, data, and instructions, including program, i.e., application code, through communication link 516 and communication interface 514. Received program code may be executed by processor 504 as it is received, and/or stored in static storage 508 or dynamic storage 510, or other non-volatile storage for later execution. A database 520 may be used to store data accessible by the system 500 by way of data interface 518.

Herein, a non-transitory computer readable medium (also referred to as "computer-readable non-transitory storage medium") includes instructions, when executed, cause a processor to execute various functionalities described herein. In some embodiments, a computer-readable non-transitory storage medium or media may be embodied as one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these. A computer-readable non-transitory storage medium may be volatile, non-volatile, or a combination of volatile and non-volatile.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific amount of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific amount of an introduced claim recitation is explicitly recited, those skilled in the art will recognize that such recitation should typically be interpreted to mean at least the recited amount (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by a waste diversion system and from a first source, first waste materials;
   receiving, by a waste diversion system and from a second source, second waste materials;
   inserting, by the waste diversion system and into the first waste materials, a first isotopic marker;
   inserting, by the waste diversion system and into the second waste materials, a second isotopic marker;
   sorting the first waste materials and the second waste materials into usable waste materials and rejected waste materials;
   detecting, in the rejected waste materials, by the waste diversion system, a first amount of the first isotopic marker and a second amount of the second isotopic marker;
   determining, by the waste diversion system, based on the detected amounts of the first isotopic marker and the second isotopic marker, an amount of the rejected waste materials from the first source and an amount of the rejected waste materials from the second source;
   inserting, by the waste diversion system and into the usable waste materials, a third isotopic marker;
   generating, by the waste diversion system, finished goods including a portion of the usable waste materials; and
   detecting, by the waste diversion system, using mass spectrometry, an amount of the third isotopic marker corresponding to the portion of the usable waste materials in the finished goods; and
   calculating, by the waste diversion system, a yield based on the portion of the usable waste materials in the finished goods and the amount of the rejected waste materials.

2. The method of claim 1, wherein the first isotopic marker identifies a composition of the first waste materials.

3. The method of claim 1, further comprising determining a weight of the first waste materials.

4. The method of claim 3, further comprising:
   determining a first isotopic marker amount in proportion to the determined weight; and
   inserting the amount in proportion to the determined weight.

5. The method of claim 4, further comprising determining a weight of the first portion of waste materials in the finished goods in proportion to the amount detected.

6. The method of claim 1, further comprising determining a first source yield as ratio of a weight of the portion of first waste materials in the finished goods and a second weight of the first waste materials marked upon receipt.

7. The method of claim 1, further comprising determining a credit value associated with the finished goods based on detecting the third isotopic marker.

8. The method of claim 7, wherein determining the credit value includes determining the credit value as a materials received weight less than a sum of at least one of a rejected material weight, an augments weight, an additives weight, a facers weight, and a loss of material in manufacturing.

9. A non-transitory computer readable medium comprising instructions that, when executed by a processor, cause the processor to:
   receive first waste materials from a first source;
   receive second waste materials from a second source;
   insert a first isotopic marker into the first waste materials;
   insert a second isotopic marker into the second waste materials;
   sort the first waste materials and the second waste materials into usable waste materials and rejected waste materials;
   detect, in the rejected waste materials, a first amount of the first isotopic marker and a second amount of the second isotopic marker;
   determine, based on the detected amounts of the first isotopic marker and the second isotopic marker, an amount of the rejected waste materials from the first source and an amount of the rejected waste materials from the second source;
   insert into the usable waste materials, a third isotopic marker;
   generate finished goods including a portion of the usable waste materials; and
   detect, using mass spectrometry, an amount of the third isotopic marker corresponding to the portion of the usable waste materials in the finished goods; and
   calculate a yield based on the portion of the usable waste materials in the finished goods and the amount of the rejected waste materials.

10. The medium of claim 9, wherein the first isotopic marker identifies a composition of the first waste materials.

11. The medium of claim 9, further comprising instructions that, when executed by the processor, cause the processor to determine a weight of the first waste materials.

12. The medium of claim 11, further comprising instructions that, when executed by the processor, cause the processor to: determine a first isotopic marker amount in proportion to the determined weight; and insert the amount in proportion to the determined weight.

13. The medium of claim 9, further comprising instructions that, when executed by the processor, cause the processor to: detect a first isotopic marker amount; and determine a weight of the portion of first waste materials in the finished goods in proportion to the amount detected.

14. The medium of claim 13, further comprising instructions that, when executed by the processor, cause the processor to determine a first source yield as ratio of a weight of the portion of first waste materials in the finished goods and a second weight of the first waste materials marked upon receipt.

15. The medium of claim 9, further comprising instructions that, when executed by the processor, cause the processor to determine a credit value associated with the finished goods based on detecting the third isotopic marker.

16. An apparatus comprising a processor having programmed instructions to:
    receive first waste materials from a first source;
    receive second waste materials from a second source;
    insert a first isotopic marker into the first waste materials;
    insert a second isotopic marker into the second waste materials;
    sort the first waste materials and the second waste materials into usable waste materials and rejected waste materials;
    detect, in the rejected waste materials, a first amount of the first isotopic marker and a second amount of the second isotopic marker;
    determine, based on the detected amounts of the first isotopic marker and the second isotopic marker, an amount of the rejected waste materials from the first source and an amount of the rejected waste materials from the second source;
    insert into the usable waste materials, a third isotopic marker;
    generate finished goods including a portion of the usable waste materials; and
    detect, using mass spectrometry, an amount of the third isotopic marker corresponding to the portion of the usable waste materials in the finished goods; and
    calculate a yield based on the portion of the usable waste materials in the finished goods and the amount of the rejected waste materials.

17. The apparatus of claim 16, the processor having further programmed instructions to:
    determine a weight of the first waste materials; and
    insert a first isotopic marker amount in proportion to the determined weight.

18. The apparatus of claim 16, the processor having further programmed instructions to: detect a first isotopic marker amount; and determine a weight of the portion of first waste materials in the finished goods in proportion to the amount detected.

19. The apparatus of claim 16, the processor having further programmed instructions to determine a first source yield as ratio of a weight of the portion of first waste materials in the finished goods and a second weight of the first waste materials marked upon receipt.

* * * * *